United States Patent [19]
Hoppe

[11] Patent Number: 5,896,356
[45] Date of Patent: Apr. 20, 1999

[54] SPLITTING CARTRIDGE AND THE REMOVABLE CARTRIDGE DISK DRIVE IN WHICH IT IS USED

[75] Inventor: Robert F. Hoppe, Boulder Creek, Calif.

[73] Assignee: Avatar Systems Corp., Milpitas, Calif.

[21] Appl. No.: 08/592,032

[22] Filed: Jan. 26, 1996

[51] Int. Cl.$^6$ ............................................. G11B 33/02
[52] U.S. Cl. ............................................. 369/75.2
[58] Field of Search ........................ 369/75.1–75.2, 369/77.1–77.2, 291; 360/99.02, 99.06, 133, 135

[56] References Cited

U.S. PATENT DOCUMENTS

| | | | |
|---|---|---|---|
| 5,249,091 | 9/1993 | Shimizu et al. | 360/99.06 |
| 5,327,412 | 7/1994 | Lee | 369/75.2 |
| 5,699,338 | 12/1997 | Leung | 369/77.1 |

FOREIGN PATENT DOCUMENTS

| | | | |
|---|---|---|---|
| 2396380 | 3/1979 | France | 360/133 |

*Primary Examiner*—Allen T. Cao
*Attorney, Agent, or Firm*—George W. Finch

[57] ABSTRACT

A disk drive with removable cartridges that is designed for laptop and notebook sized computers which are battery powered. The drive includes a disk cartridge that upon insertion into the disk drive is split open to move an underside portion down over a disk drive spindle where the disk, having been released by the splitting of the cartridge engages the spindle for rotation. The spindle is mounted in the drive in a fixed location so that loading of disks thereon is repeatable and interchangeable and do not change with wear of a spindle elevating mechanism. The read/write heads on their actuator arms extend through an opening in the back of the cartridge formed when the cartridge is split. When ejected, the cartridge seals about the disk to prevent contamination thereof and to assure a long life in harsh environments. The cartridge may include an inner door that is opened upon cartridge insertion to provide clearance for the heads and actuator arms.

8 Claims, 4 Drawing Sheets

SPLITTING CARTRIDGE AND THE REMOVABLE CARTRIDGE DISK DRIVE IN WHICH IT IS USED

FIELD OF THE INVENTION

The present invention relates to small, low power and fast, disk drives for data storage on disks enclosed in cartridges that can be inserted and removed from the disk drives by the user.

BACKGROUND OF THE INVENTION

Disk drives for removable magnetic and optical disks have been available for some time. Magnetic disks generally come in a flexible form known as floppies, or a relatively rigid form known as hard disks, whereas optical disks are embodied in relatively rigid media. Typical flexible disk drives and cartridges are shown in U.S. Pat. No. 4,445,155 to Takahashi, et al.; U.S. Pat. No. 4,445,174 to Takahashi; U.S. Pat. No. 4,546,397 to Asami, et al; U.S. Pat. No. 4,573,093 to Obama, et al; and U.S. Pat. No. 4,675,758 to Tanaka. Typical removable hard disk drives and the cartridges therefor are shown in U.S. Pat. No. 4,488,187 to Alaimo; U.S. Pat. No. 4,503,474 to Nigam; U.S. Pat. No. 4,504,879 to Toldi, et al.; U.S. Pat. No. 4,683,506 to Toldi, et al.; U.S. Pat. No. 4,717,981 to Nigam, et al; U.S. Pat. No. 4,722,012 to Toldi, et al.; U.S. Pat. No. 4,864,452 to Thompson, et al.; U.S. Pat. No. 4,870,518 to Thompson, et al.; U.S. Pat. No. 4,864,437 to Couse, et al.; U.S. Pat. No. 4,920,462 to Couse, et al.; U.S. Pat. No. 4,965,685 to Thompson, et al.; and U.S. Pat. No. 4,965,691 to Iftikar, et al. Disk drives having removable disks usually have some sort of entry door and a mechanism to receive a disk cartridge when it is inserted into the drive to assure proper connection therebetween. Most of such disk drives include a motor or solenoid which, after actuation by partial manual insertion of the disk cartridge, draws the cartridge into the drive, moves a shutter to open a window for access to the disk and positions read/write heads on one or both sides of the disk for data reading and writing. When a floppy disk or an optical disk is involved, usually the heads are driven linearly, such as by a stepper motor or linear voice coil actuator, whereas when a hard disk is involved, a linear actuator may be used or the heads may be moved arcuately across the disk by a rotary voice coil actuator. In floppy disk drives, the heads are designed to lightly touch the magnetic media during reading and writing. In optical drives, the read/write heads are spaced a safe distance away from the disk, laser beams being used in most instances to read and write the optical information. In magnetic hard disks, the read/write heads float on an extremely thin layer of air so they never touch the disk while spinning. Unlike floppy disks which wear out after a short use time, this allows hard disks to last the lifetime of the computer to which they are connected. Dust or other contamination, if it is the correct size, can get between the read/write heads and the disk and cause damage to the magnetic media of a hard disk. For that reason, nonremovable hard disk drives are sealed. In removable cartridge hard disk drives, means must be provided to minimize contamination, especially in the sizes of ~20 to ~80 nm, because particles smaller than that pass between the disk and a head in the layer of air and particles larger than that tend to be knocked out of the way by the head flying at its normal height above the disk.

Generally, the requirements for a hard disk cartridge are: protect the disk from damage and contamination; provide access for the read/write heads on both sides of the contained disk; provide a positive rotational interface to the disk drive for spinning the disk; provide sufficient rigidity to assure that all but extreme stresses do not cause the cartridge housing to bend and come in contact with the disk; provide some sort of mechanism to open the contamination preventing shutter of the cartridge when the cartridge is inserted into the disk drive and to close the shutter as the cartridge is being ejected; and do all of this in a minimum volume. Heretofore, most removable hard disks have been available in cartridges about 6 inch square and over ½ inch thick. The disk drive must accommodate the cartridge internally for contamination control. Therefore, removable cartridge disk drives must be proportionately larger than those with non-removable disks, so much larger in fact that removable cartridge disk drives have been too big to serve as internal disk drives in lap top or notebook sized computers. Also, prior art removable cartridge disk drives, with their ejection system motors and disk retaining solenoids, use a relatively large amount of power when compared to small, efficiently sealed hard drives.

Recently tiny removable disk, hard disk drives, such as shown in U.S. Ser. No. 07/973,838 by McGrath et al. filed Nov. 9, 1992 and assigned to Applicant's Assignee, have become available, in which the hard disk is protected by a removable cartridge. The cartridge includes a window to allow access to the disk by read/write heads, a shutter to close the window except when the cartridge is in a disk drive and a hole on one side to provide access to a disk hub used to spin the disk. The disk drive includes a complex mechanical cartridge insertion and ejection mechanism.

When a cartridge is manually inserted, it contacts an insertion pin connected to linkage. Further manual insertion of the cartridge forces the insertion pin in an arcuate path, which through connecting linkage stores energy in springs. As the cartridge is fully inserted in the disk drive, linkage in the form of sliding cams lifts a drive motor with its connected spindle, up into a magnetic engagement with the hub of the disk.

A short electrical pulse is applied to a trigger magnet to eject the cartridge. The trigger magnet responds by releasing a portion of the linkage, unlatching the spring force therein, which lowers the motor disconnecting the spindle from the hub. Thereafter, the linkage applies the force of loaded springs through the insertion pin to the cartridge to eject it.

Since the drive motor and spindle are moved into contact with the disk as the cartridge is being inserted, the final position of the disk on the spindle may vary each time the cartridge is inserted. Also, small amounts of dimensional variance from cartridge to cartridge or between different disk drives, or wear of the sliding cams can cause interchangeability problems.

Therefore, there has been a need to provide a mechanically simple, reliable, removable cartridge hard drive with very low power requirements, which uses removable cartridges having minimal size so that the drive can physically fit in available space in lap top and notebook sized personal computers while having a drive motor and spindle that remain in a fixed position with respect to the read/write heads of the drive.

SUMMARY OF THE INVENTION

The present invention is a small, thin, high density, removable cartridge, hard disk drive and the cartridges therefor, especially adapted for use in laptop and notebook sized computers. The hard disk drive needs very little power and allows storage of at least 200 megabytes of data on a disk contained in a generally rectangular, thin cartridge about 5 by 70 by 80 millimeters in size. Hereinafter, the invention is described with respect to its normal orientation with respect to gravity although it can be operated in other orientations.

The disk drive is characterized by having a spindle and drive motor that is mounted in a fixed location so that no complex spindle-elevating mechanism is required. The removable cartridge for the disk drive includes upper and lower housing members, which when outside a disk drive, surround, protect and hold the disk on which data is stored in a fixed location. The disk is held by contact between the housing members and abutment surfaces located at or near the hub of the disk. The upper housing member includes grooves, tabs, lips, downwardly facing abutment surfaces or the like which mate with internal structure within the disk drive to restrain movement of the upper housing to a planar horizontal direction when the cartridge is inserted into the disk drive. Normally the outer end of the cartridge remains outside the disk drive where it can be manually manipulated. The lower housing member has an annulus therethrough to allow access to the hub of the disk for spinning by the spindle of the disk drive.

The two housing members are connected together by cams and cam followers, pivoting linkage, pivots or the like that allow at least the inner end of the cartridge to be split apart when inserted into the disk drive. The force for splitting the cartridge apart is provided by manual force applied to the outer end of the upper housing member when the lower housing member is in contact with an abutment surface within the disk drive. This causes the lower housing member to descend away from the upper housing member until engagement occurs between the hub of the disk and the spindle and the lower housing is out of contact with the disk so it can be spun by the spindle. When the upper and lower housing members are split apart, the inner end of the cartridge is opened so that read/write heads on actuator arms can be moved in proximity to the disk. Thereafter, the upper housing member is retained within the disk drive by a suitable latch so the manual force is no longer required, while tension springs connected between the upper and lower housing members try to return the housing members to their closed position completely surrounding the disk. When the read/write heads are withdrawn and the latch is released, the spring force between the housing members causes them to move together surrounding and protecting the disk and become partially ejected from the drive to a location where the cartridge can be manually removed.

Thus, it is an object of the present invention to provide a high-density removable cartridge data storage device, which has a spindle and drive motor that remain in a fixed position.

Another object is to provide a hard disk drive which has no power-hungry hold in solenoids, or drive motors in its insertion/ejection mechanism.

Another object is to provide a removable cartridge for a hard disk drive, which when removed from a disk drive, seals the environment about the disk contained therein and does not require a shutter.

Another object is to provide a lightweight, removable cartridge, hard disk drive which is relatively economical to manufacture and assemble.

Another object is to provide a hard disk drive and removable cartridges therefor that can be used in any orientation with respect to gravity.

Another object is to provide a removable cartridge for a hard disk drive that can be manufactured with few tolerance constraints.

These and other objects and advantages of the present invention will become apparent to those skilled in the art after considering the following detailed specification, together with the accompanying drawings, wherein:

DETAILED DESCRIPTION OF THE SHOWN EMBODIMENTS

Figure 1:
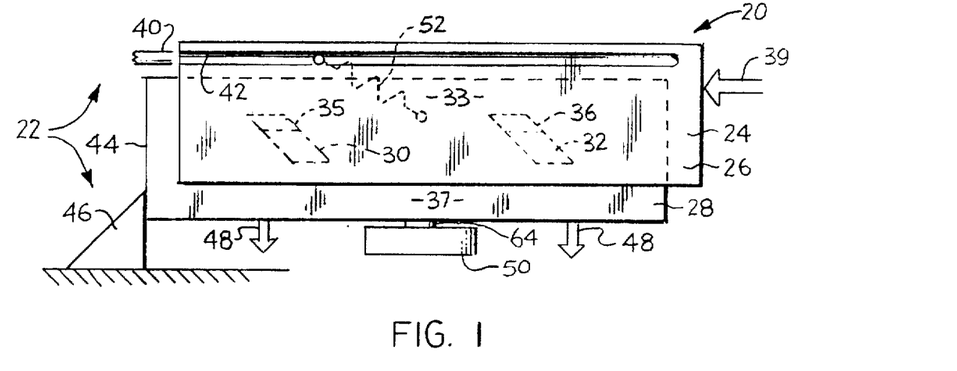
FIG. 1 is a diagrammatic side view of a disk cartridge as it is being inserted into a disk drive of the present data storage system.
Figure 2:
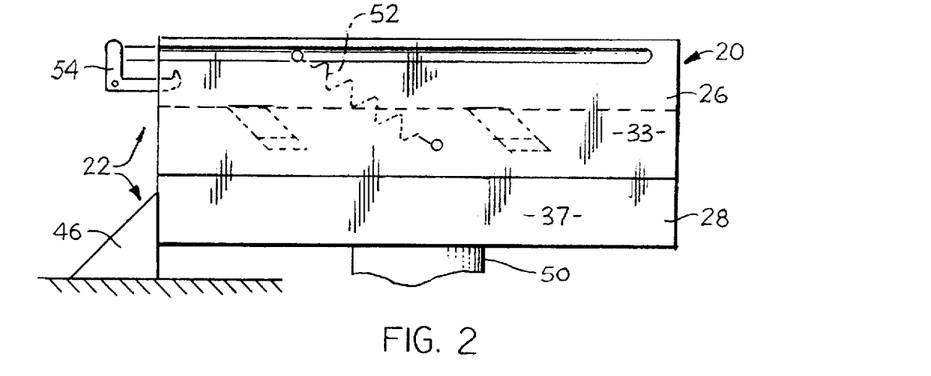
FIG. 2 is a diagrammatic side view of the disk cartridge of FIG. 1 after it is inserted into the disk drive.
Figure 3:
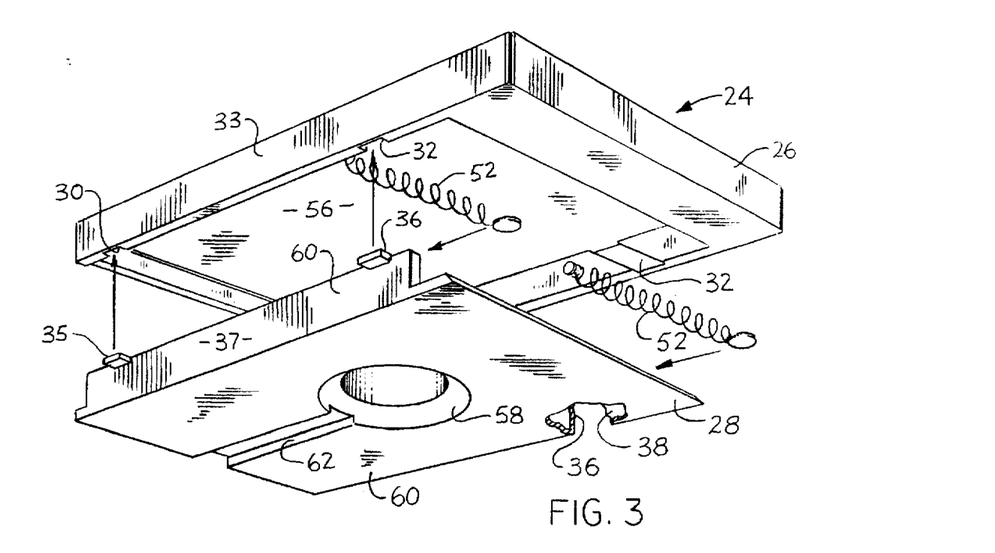
FIG. 3 is an exploded underside perspective view of the housing portions of the cartridge of FIGS. 1 and 2.

Referring to the drawings more particularly by reference numbers, number 20 in FIGS. 1 and 2 refers to a removable disk cartridge disk drive system, which includes a disk drive 22 with a cartridge 24 being inserted therein. As shown, the cartridge 24 includes two nesting housing members, upper housing member 26 and lower housing member 28, which are connected together by inner and outer cams 30 and 32 formed in the sides 33 and 34 of the upper housing member 26 and inner and outer cam followers 35 and 36 formed extending out of opposite sides 37 and 38 of the lower housing member 28 (FIG. 3). The cams 30 and 32 as shown are angled linear slots whereas the followers 35 and 36 have the mating trapezoidal cross-section shown. When manual force, as shown by arrow 39, is applied to the upper housing member 26, which is restrained to movement in a planar direction by slide tongues 40 of the drive 22 and grooves 42 formed in the upper housing member 26, the backside 44 of the lower housing member 28 contacts a fixed stop 46. Further inward movement of the upper housing member 26 causes the lower housing member 28 to move in the direction of arrows 48 down over the disk drive spindle 50 so that the housing members 26 and 28 are split apart as shown in FIG. 2 with the lower housing member 28 descended far enough that the spindle 50 can engage the hub of a disk to be described hereinafter. The stop 46 may be constructed from anti-friction material or with an anti-friction coating to reduce the force required to move the lower housing member 28 downwardly, or small rollers (not shown) may be incorporated into the lower housing 28 for the same purpose. When the upper and lower housing members 26 and 28 are split apart, they additionally stretch tension springs 52 connected between the opposite sides 33 and 37, and 34 and 38 of the housing members 26 and 28. The tension in the springs 52 normally would cause the upper and lower housing members 26 and 28 to return to the position shown in FIG. 1 once manual force is removed. Therefore, a latch 54 is provided in the disk drive 22 to hold the upper housing portion 26 in the inserted position shown in FIG. 2. When it is desired to eject the cartridge 24, the latch 54 is released from the upper housing member 26 and the springs 52 eject the cartridge 24 far enough that it can be manually removed from the disk drive 22.

The construction of the cartridge 24 and how it is formed from the housing members is shown in detail in FIG. 3 wherein the cams 30 and 32 on both sides 33 and 34 of the upper housing member 26 and the cam followers 35 and 36 on the opposite sides 37 and 38 of the lower housing member 28 are shown. Only three cams and followers are actually required, but the fourth assures that the upper and lower housing members 26 and 28 remain parallel to each other. It should be noted that the sides 37 and 38 nest within the sides 33 and 34 to form an enclosure about the interior 56 of the cartridge 24. The bottom housing member 28 includes an annulus 58 so that the spindle 50 can pass therethrough for engagement with the disk. The annulus 58 extends through the bottom side 60 of the housing member 28 and has a groove 62 extending therefrom to the backside 44 to provide clearance for the centering protrusion 64 of the spindle 50 when the cartridge 24 is inserted into the disk drive 22.

Figure 4:
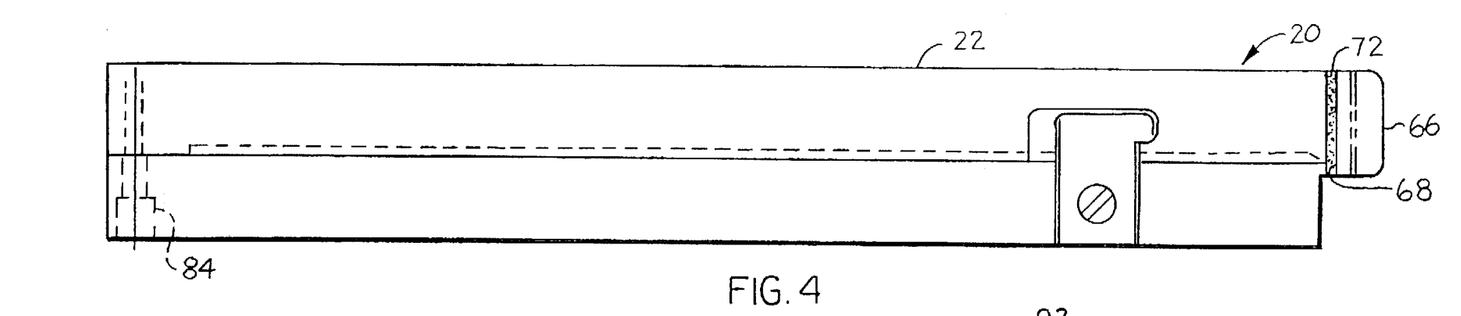
FIG. 4 is an enlarged side elevational view showing the present drive with a cartridge positioned therein.
Figure 5:
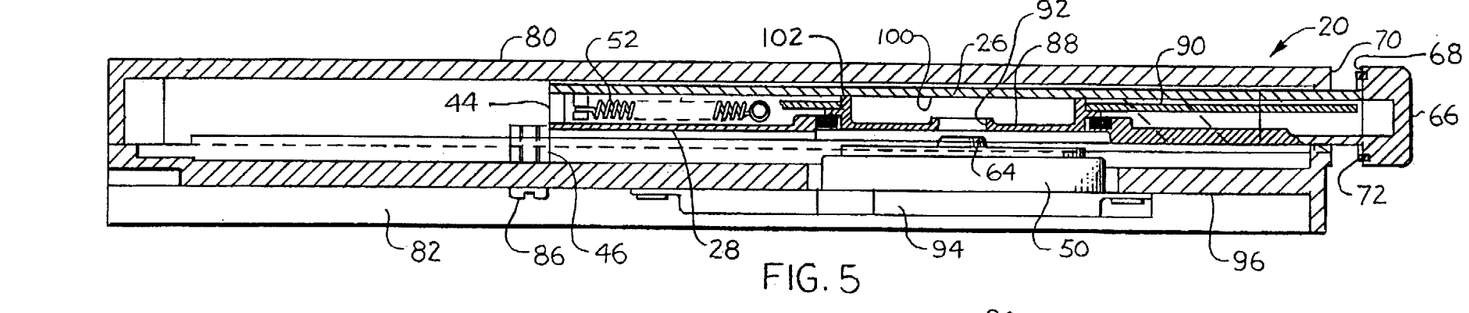
FIG. 5 is an enlarged cross-sectional view through the center of the disk drive and cartridge with the cartridge positioned within the drive just far enough that insertion any further will cause the cartridge to open.
Figure 6:
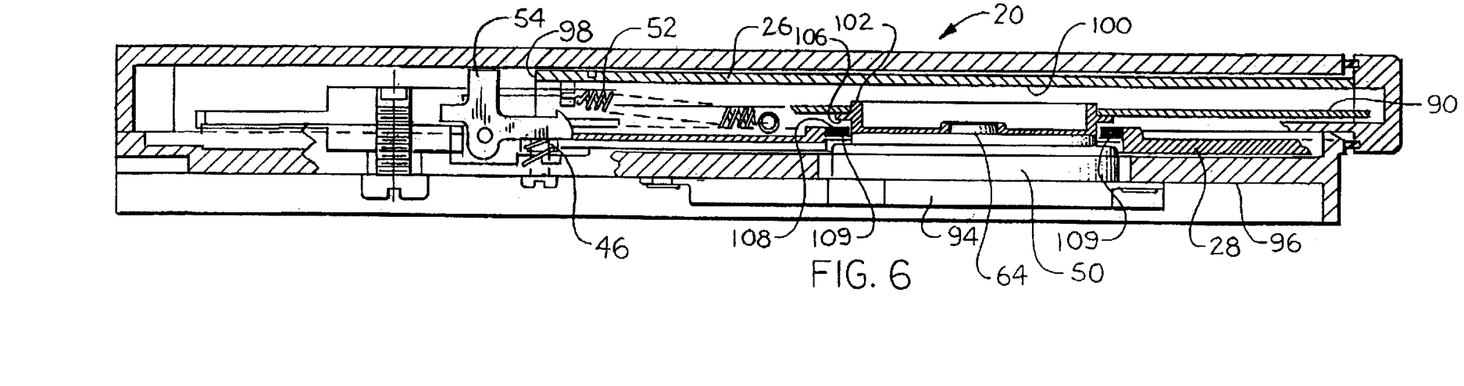
FIG. 6 is an enlarged cross-sectional view similar to FIG. 5 with the cartridge in its open position fully inserted within the drive with the disk hub engaged with the drive spindle.

FIGS. 4, 5 and 6 show the system 20 in greater detail as is proposed for a commercial embodiment. In FIG. 4, the outline of the drive 22 is shown so that the relatively small space required for the drive 22 is illustrated, and the outer end 66 of the upper housing member 24 is shown with a cartridge 22 in its fully-inserted position. The outer end 66 includes an inwardly-facing surface 68, which mates with the outer end surface 70 of the drive 22. A seal 72 is positioned between the surfaces 68 and 70 to assure that when the cartridge 24 is installed in a drive 22, the interior of the drive 22 is sealed against airborne contamination.

The disk drive 22 includes upper and lower case members 80 and 82, which typically are held together with means such as screws 84. The disk drive 22 is constructed with two case members 80 and 82 to simplify interior machining required to form the base for the rest of the mechanical components of the drive 22.

In FIG. 5, the cartridge 24 is shown inserted in the drive 22 to the position where the back portion 44 just contacts the stop 46. The stop 46 is shown mounted with a screw 86 so that the location of the stop 46 can be finely adjusted during final assembly to assure interchangeability. The stop 46 may be a cylinder slightly eccentric to the screw 86 to allow ultrafine adjustments by slight rotation of the stop 46. With the cartridge 24 in that position, the hub 88 of the disk 90 is aligned over the spindle 50 so that the protrusion 64, which is slightly tapered, can assure precise alignment between the hub 88 and the spindle 50 as the protrusion 64 mates with a hub centering hole 92 within the hub 88. The tapered protrusion 64 compensates for slight misalignments and reduces off center engagements of the disk 90 with the spindle 50 to values that can be tolerated by the read/write mechanism, not shown. Note that the spindle 50 with its motor 94 are fixedly attached to the underside 96 of the lower case member 82 so that the positioning thereof with respect to the stop 46 remains constant and is not subject to wear.

As shown in FIG. 6, as the outer end 66 of the upper housing member 26 is pushed to its final location in the drive 22 with the seal 72 operative, the lower housing member 28 is forced downwardly out of the way, dropping the disk 90 to an operative position with its hub 88 mounted on the spindle 50. Usually, the spindle 50 is magnetic and the hub 88 is of a material attracted by the magnetic fields generated by the magnetic spindle 50 so that the hub 88 remains removably magnetically attached to the spindle 50 and rotates therewith. At the same time, the latch 54 engages the upper housing member 26 so that the cartridge 24 remains within the drive 22 with the inner end 98 of the cartridge 24 open, so that read/write heads can be moved over the disk 90 for the reading and writing of digital data through the open inner end 98.

When the latch 54 is released, the springs 52 cause the cartridge 24 to return to the position shown in FIG. 5 where the outer end 66 can be manually pulled to remove the cartridge 24 from the drive 22. As the cartridge 24 transitions from the position shown in FIG. 6 to the position shown in FIG. 5, the inner surface 100 of the upper housing member 26 comes into contact with an upper ring abutment surface 102 on the hub 88 while at the same time a lower ring surface 106 about the hub 88 is forced onto an upper annular ring surface 108, thereby securing the disk 90 from movement. The annular ring surface 108 may be formed of magnetized material 109, which retains the hub 88 thereto until it is dislodged by contact with the spindle 50. This allows the cartridge 24 to be used in various orientations with respect to gravity and the disk 90 still be properly engaged and disengaged by the spindle 50 as the cartridge 24 is inserted into or removed from the drive 22.

Figure 7:
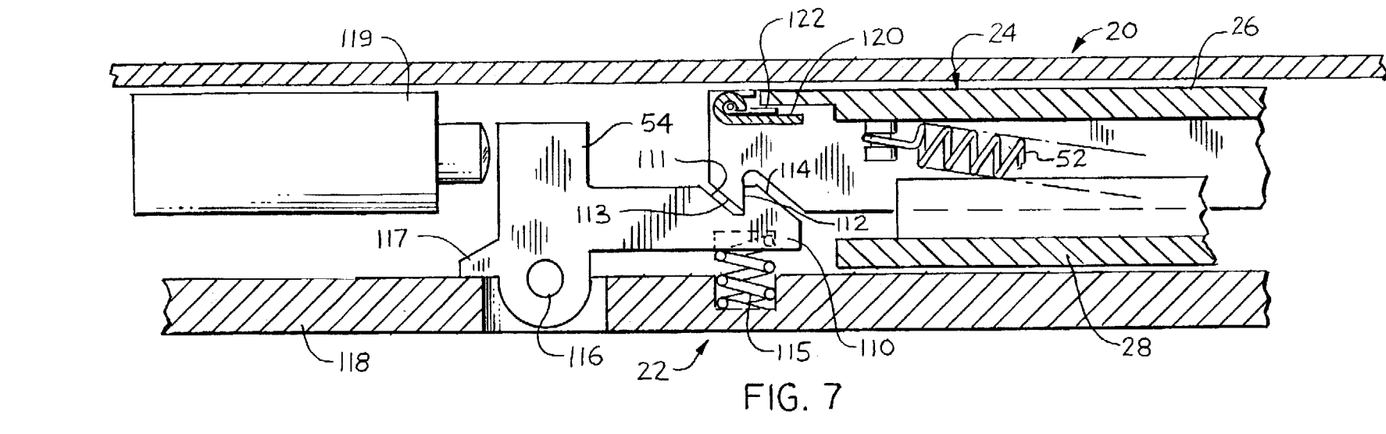
FIG. 7 is a greatly enlarged cross-sectional detail view of the latch of FIGS. 5 and 6.

The latch 54 is shown in greater detail in FIG. 7. The latch 54 includes an arm 110 with a catch notch 111 formed in the end thereof to engage a lip 112 formed in the upper housing member 26. The lip 112 has a chamfered abutment surface 113 which engages a similar chamfered abutment surface 114 on the latch arm 110 so that as the cartridge 24 is inserted into the drive 22, the two abutment surfaces 113 and 114 force the latch arm 110 against a compressed spring 115 until the notch 111 clears the lip 112 to retain the cartridge 24 within the drive 22. The latch 54 rotates about a pivot 116 through an angle that is restricted by engagement of a stop 117 and the case 118 of the disk drive 22 in a counterclockwise direction as shown at FIG. 7 and by engagement between the arm 110 and the disk drive case 118 in the clockwise direction. When it is desired to release the latch 54, thereby allowing ejection of the cartridge 24, a solenoid 119 is momentarily energized to strike the latch 54 and rotate it in the clockwise direction thereby releasing the lip 112 from the notch 111. Although a solenoid 119 and the compression spring 115 are shown, the same result can be obtained by a releasing trigger magnet or other devices known in the art.

Figure 8:
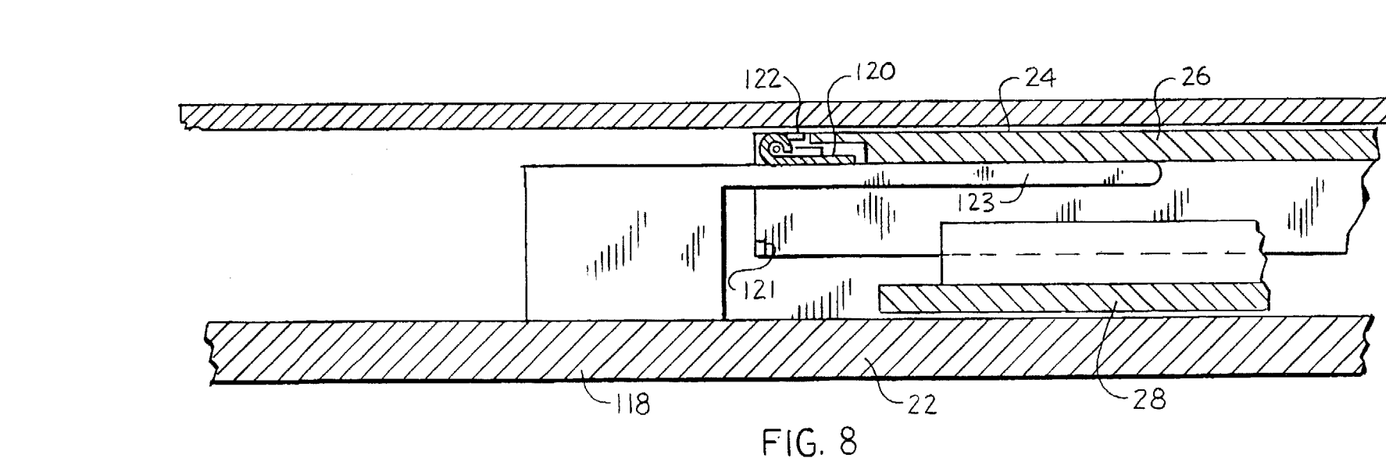
FIG. 8 is a greatly enlarged cross-sectional detail view of the inner door included in the cartridge of FIGS. 5, 6 and 7 and door opener therefor.

In some instances, additional clearance for the actuator arms and read/write heads of the disk drive 22 is desired for access to the disk 90. Therefore, a door 120, as shown in FIG. 8, is provided pivoted to the upper housing member. The door 120 is spring-loaded closed against a stop 121 by a torsion spring 122 at the sides of the upper housing member 26 so that it normally remains vertical, in the orientation of FIG. 8. As the cartridge 24 is inserted into the disk drive 22, a probe 123 extends within the cartridge 24 to open the door 120. The probe 123 may be incorporated as part of an actuator arm ramp (not shown) or be separately connected to the case 118 of the drive.

Figure 9:
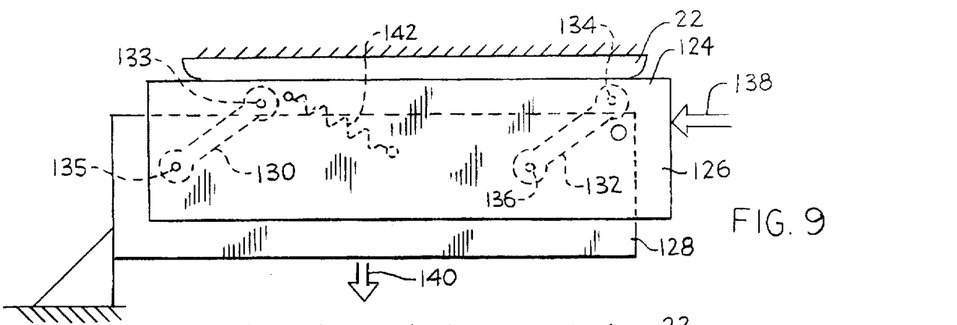
FIG. 9 is a a diagrammatic side view of a modified disk cartridge as it is being inserted into a disk drive of the present data storage system showing linkage to connect upper and lower portions thereof together.
Figure 10:
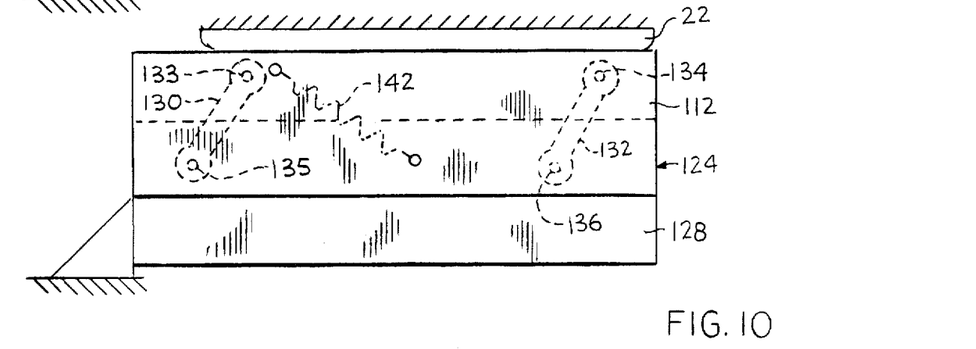
FIG. 10 is a diagrammatic side view of the disk cartridge of FIG. 9 after it is inserted into the disk drive.

A modified cartridge 124 is shown in FIGS. 9 and 10 wherein the upper housing member 126 and the lower housing member 128 are held together by rear links 130 and front links 132 connected by pivots 133 and 134 to the top housing member 126 and pivots 135 and 136 to the lower housing member 128. Normally the links 130 and 132 are positioned on opposite sides of the cartridge 124 to assure that the upper and lower housing members 126 and 128 remain in parallel alignment, even when subjected to stress, although only two links on one side and one on the other are absolutely required to maintain parallel alignment. The relative motion created between the upper housing member 126 and the lower housing member 128 by insertion in the direction of arrow 138 is circular rather than linear, but the effect of the movement of the lower housing member 128 in the direction of arrow 140 is the same as for cartridge 24, that is it descends down over the spindle 50 against the force of springs 142.

Figure 11:
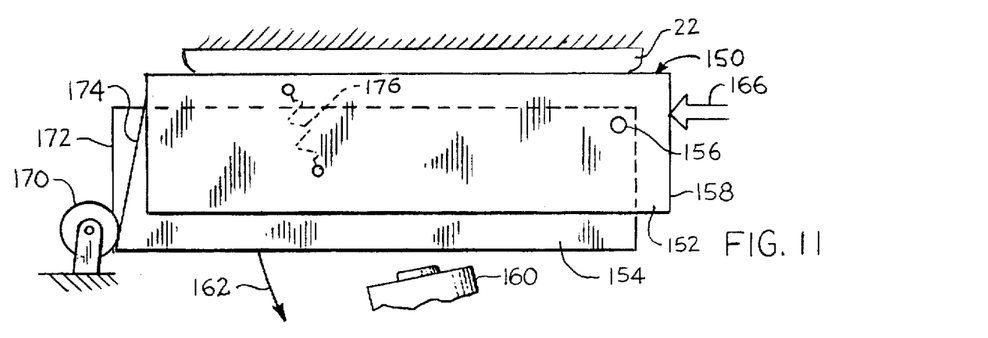
FIG. 11 is a diagrammatic side view of a modified disk cartridge as it is being inserted into a disk drive of the present data storage system that uses a pivot to connect upper and lower portions thereof together.
Figure 12:
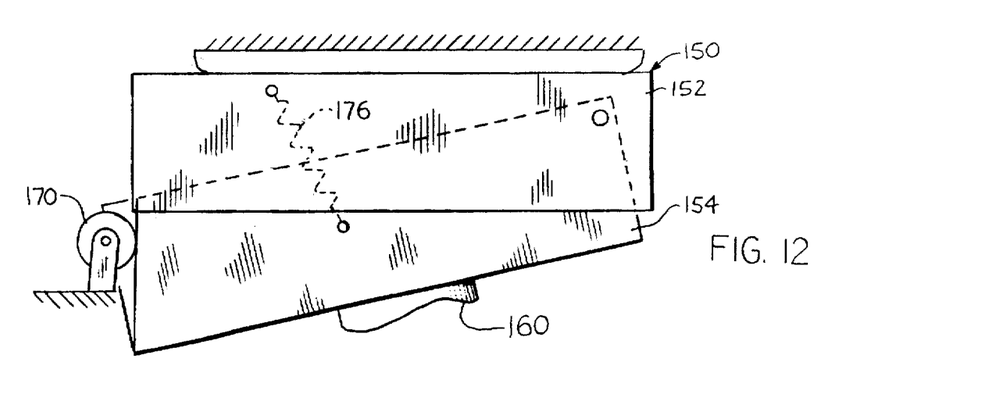
FIG. 12 is a diagrammatic side view of the disk cartridge of FIG. 11 after it is inserted into the diskdrive.

In FIGS. 11 and 12, a splitting cartridge 150 is shown where the upper housing member 152 and the lower housing member 154 rotate with respect to each other rather than move parallel to each other. This is accomplished by providing a pivot 156 near the outer end 158 of the cartridge 150 between the upper and lower housing members 152 and 154, which allows the lower housing member 154 to rotate down onto the spindle 160, which is mounted at a slight angle. The movement of the lower housing member 154 as shown by arrow 162. To reduce the frictional loads that might be created by manual force, shown by arrow 166, applied against the outer end 158 of the cartridge 150, a roller stop 170 is employed to allow easy pivoting of the lower housing member 154. To further reduce the loads, one or more stops 170 can be positioned to engage the backside 172 of the cartridge 150 at scarfed edges 174 so that the roller stop 170 has more leverage about the pivot 156 to deform the tension springs 176 otherwise holding the cartridge 150 together.

Although the disk drive 22 and the cartridges 24, 124 and 150 are shown in their normal horizontal positions and so described, and above, unless otherwise stated, such positioning is assumed, the disk drive 22 and the cartridges 24, 124 and 150 can be used in any orientation with respect to gravity.

Thus, there has been shown and described novel removable cartridge disk drive systems and the removable cartridges used therein, which fulfill all of the objects and advantages sought therefor. Many changes, alterations, modifications and other uses and applications of the subject systems and cartridges will become apparent to those skilled in the art after considering this specification together with the accompanying drawings. All such changes, alterations and other modifications which do not depart from the spirit and scope of the invention are deemed to be covered by the invention, which is limited only by the claims that follow:

I claim:

1. A disk drive data storage system including:
   a disk cartridge including:
      a first housing member;
      a second housing member;
      means to guide said second housing member away from said first housing member;
      means for retaining said first and second housing members together; and
      a disk for storage of data positioned between said first and second housing members; and
   a disk drive including:
      a drive housing adapted for insertion of said disk cartridge therein; and
      a disk drive spindle fixedly located and connected for rotation to said drive housing, said disk drive spindle being located so that said disk drive spindle engages said disk as said second housing member is guided away from said first housing member during insertion of said disk cartridge, wherein said disk cartridge is inserted into said drive housing in a fixed direction and wherein said means to guide said second housing member away from said first housing member include:
         at least three cam followers extending from at least one of said housing members;
         at least three cam slots formed at angles to the direction of insertion in which said cam followers are restrained; and
         means to restrain said first housing member to planar motion.

2. A disk cartridge for a disk drive data storage system including:
   a longitudinal axis;
   a first housing member;
   a second housing member;
   means to guide said second housing member away from said first housing member at other than said longitudinal axis when said first and second housing members are longitudinally displaced from each other;
   means for restraining longitudinal displacement of said first and second housing members; and
   a disk for storage of data positioned between said first and second housing members, said disk having:
      an axis of rotation at right angles to said longitudinal axis, wherein said means to guide said second housing member away from said first housing member include:
         at least three cam followers extending from at least one of said housing members; and
         at least three cam slots formed perpendicular to said longitudinal axis and at an angle to said axis of rotation in which said cam followers are restrained.

3. A disk drive data storage system including:
   a disk cartridge including:
      a first housing member;
      a second housing member;
      means to guide said second housing member away from said first housing member;
      means for retaining said first and second housing members together; and
      a disk for storage of data positioned between said first and second housing members; and
   a disk drive including:
      a drive housing adapted for insertion of said disk cartridge therein; and
      a disk drive spindle fixedly located and connected for rotation to said drive housing, said disk drive spindle being located so that said disk drive spindle engages said disk as said second housing member is guided away from said first housing member during insertion of said disk cartridge, wherein said disk cartridge further includes:

a door having:
  an open position; and
  a closed position; and
  a spring to bias said door in said closed position, and wherein said disk drive further includes:
    a latch positioned for engagement with at least one of said housing members to retain said disk cartridge within said disk drive; and
    a probe to force said door to said open position at least when said latch is engaged with said at least one of said housing members.

4. A disk drive data storage system including:
a disk cartridge including:
  a first housing member;
  a second housing member;
  means to guide said second housing member away from said first housing member;
  means for retaining said first and second housing members together; and
  a disk for storage of data positioned between said first and second housing members; and
a disk drive including:
  a drive housing adapted for insertion of said disk cartridge therein; and
  a disk drive spindle fixedly located and connected for rotation to said drive housing, said disk drive spindle being located so that said disk drive spindle engages said disk as said second housing member is guided away from said first housing member during insertion of said disk cartridge, wherein said drive housing includes:
    a slot for insertion of said disk cartridge therein; and
    an abutment surface about said slot, wherein said first housing member includes:
      a front grip portion for pushing said disk cartridge into said disk drive, said front grip portion including:
        a grip ring surface facing said abutment surface when said disk cartridge is inserted in said disk drive; and
        a seal positioned on said grip ring surface for sealing said grip ring surface to said abutment surface.

5. A disk drive data storage system including:
a disk cartridge including:
  a first housing member;
  a second housing member;
  means to guide said second housing member away from said first housing member;
  means for retaining said first and second housing members together; and
  a disk for storage of data positioned between said first and second housing members; and
a disk drive including:
  a drive housing adapted for insertion of said disk cartridge therein; and
  a disk drive spindle fixedly located and connected for rotation to said drive housing, said disk drive spindle being located so that said disk drive spindle engages said disk as said second housing member is guided away from said first housing member during insertion of said disk cartridge, wherein said first housing member includes:
    an inner abutment surface, wherein said disk includes:
      a hub for engagement with said disk drive spindle including:
        a hub first abutment surface facing said inner abutment surface for engagement therewith when said disk cartridge is not inserted in said disk drive; and
        a hub second abutment surface facing opposite to said hub first abutment surface, and wherein said second housing member includes:
      a hub annulus allowing access to said hub therethrough; and
      a ring surface about said hub annulus positioned for engagement with said hub second abutment surface when said disk cartridge in not inserted in said disk drive, whereby said disk is immobilized when said disk cartridge is not inserted in said disk drive and said inner abutment surface and said hub first abutment surface are engaged and said hub second abutment surface and said ring surface are engaged.

6. A disk cartridge for a disk drive data storage system including:
a longitudinal axis;
a first housing member;
a second housing member;
means to guide said second housing member away from said first housing member at other than said longitudinal axis when said first and second housing members are longitudinally displaced from each other;
means for restraining longitudinal displacement of said first and second housing members; and
a disk for storage of data positioned between said first and second housing members, said disk having:
  an axis of rotation at right angles to said longitudinal axis, wherein said means for restraining longitudinal displacement of said first and second housing members include:
    a tension spring connected between said first and second housing members and extending generally parallel to said longitudinal axis when said first and second housing members are being maintained together and wherein said first housing member further includes:
      a catch positioned for engagement by a disk drive in which said disk cartridge is inserted to resist force applied between said first and second housing members by said tension spring to releasably retain said disk cartridge within said disk drive.

7. A disk cartridge for a disk drive data storage system including:
a longitudinal axis;
a first housing member;
a second housing member;
means to guide said second housing member away from said first housing member at other than said longitudinal axis when said first and second housing members are longitudinally displaced from each other;
means for restraining longitudinal displacement of said first and second housing members; and
a disk for storage of data positioned between said first and second housing members, said disk having:
  an axis of rotation at right angles to said longitudinal axis, wherein said first housing member includes:
    a front grip portion including:
      a front grip surface for pushing said disk cartridge into a disk drive;

a grip ring surface facing opposite said front grip surface; and a seal positioned on said grip ring surface for sealing engagement with a disk drive.

8. A disk cartridge for a disk drive data storage system including:

a longitudinal axis;

a first housing member;

a second housing member;

means to guide said second housing member away from said first housing member at other than said longitudinal axis when said first and second housing members are longitudinally displaced from each other;

means for restraining longitudinal displacement of said first and second housing members; and a disk for storage of data positioned between said first and second housing members, said disk having:

an axis of rotation at right angles to said longitudinal axis, wherein said first housing member includes:

an inner abutment surface, wherein said disk includes:

a hub for engagement with a disk drive spindle including:

a hub first abutment surface facing said inner abutment surface for engagement therewith when said disk cartridge is not inserted in a disk drive; and a hub second abutment surface facing opposite to said hub first abutment surface, and wherein said second housing member includes:

a hub annulus allowing access to said hub therethrough; and a ring surface about said hub annulus positioned for engagement with said hub second abutment surface when said disk cartridge in not inserted in a disk drive, whereby said disk is immobilized when said disk cartridge is not inserted in a disk drive and said inner abutment surface and said hub first abutment surface are engaged and said hub second abutment surface and said ring surface are engaged.

* * * * *